United States Patent
Kubo et al.

(10) Patent No.: US 9,542,792 B2
(45) Date of Patent: Jan. 10, 2017

(54) BANKNOTE HANDLING APPARATUS AND BANKNOTE HANDLING METHOD

(71) Applicant: GLORY LTD., Himeji-shi, Hyogo-ken (JP)

(72) Inventors: Tomoyuki Kubo, Himeji (JP); Kazuki Ishino, Himeji (JP); Hirofumi Ozaki, Himeji (JP)

(73) Assignee: GLORY LTD., Himeji-Shi, Hyogo-Ken (JP)

( * ) Notice: Subject to any disclaimer, the term of this patent is extended or adjusted under 35 U.S.C. 154(b) by 0 days.

(21) Appl. No.: 14/378,163

(22) PCT Filed: Feb. 7, 2013

(86) PCT No.: PCT/JP2013/052856
§ 371 (c)(1),
(2) Date: Aug. 12, 2014

(87) PCT Pub. No.: WO2013/121968
PCT Pub. Date: Aug. 22, 2013

(65) Prior Publication Data
US 2015/0057795 A1  Feb. 26, 2015

(30) Foreign Application Priority Data
Feb. 13, 2012 (JP) .................. 2012-028620

(51) Int. Cl.
*G07F 19/00* (2006.01)
*G07D 11/00* (2006.01)
*G06Q 20/10* (2012.01)

(52) U.S. Cl.
CPC ....... *G07D 11/0084* (2013.01); *G06Q 20/1085* (2013.01); *G07D 11/0081* (2013.01); *G07F 19/202* (2013.01)

(58) Field of Classification Search
CPC .... G06Q 20/042; G06Q 20/10; G06Q 20/102; G06Q 20/105; G06Q 20/108; G06Q 20/1085; G06Q 20/40; G06Q 40/00; G06Q 40/02
(Continued)

(56) References Cited

U.S. PATENT DOCUMENTS 7,401,730 B2 *   7/2008   He et al. .................. 235/379
7,873,576 B2 *   1/2011   Jones .................. G06Q 20/042
                                              705/35

(Continued)

FOREIGN PATENT DOCUMENTS

CN      1636222 A       7/2005
CN      202058231 U    11/2011
(Continued)

OTHER PUBLICATIONS

European Search Report (Application No. 13749473.8-PCT/JP2013/052856) (5 pages—dated Mar. 7, 2015).
(Continued)

*Primary Examiner* — Seung Lee
(74) *Attorney, Agent, or Firm* — Renner, Kenner, Greive, Bobak, Taylor & Weber

(57) ABSTRACT

A banknote handling apparatus includes: a plurality of storing units 52 configured to store a banknote; a transport unit 18 configured to transport the banknote having been put into a machine body 2 to each of the storing units 52; a recognition unit 40 disposed at the transport unit 18 and configured to read out a serial number of the banknote having been put into the machine body 2; and a control unit 70 configured to control the transport unit 18. The control unit 70 controls the transport unit 18 such that the banknote whose serial number has been read out by the recognition unit 40 and the banknote whose serial number has not been
(Continued)

read out by the recognition unit 40 are stored into different storing units 52.

10 Claims, 4 Drawing Sheets

(58) Field of Classification Search
 USPC ........................................................ 235/379
 See application file for complete search history.

(56) References Cited

U.S. PATENT DOCUMENTS

| | | | |
|---|---|---|---|
| 7,978,899 B2* | 7/2011 | Jenrick et al. ................ | 382/135 |
| 8,245,831 B2 | 8/2012 | Holl et al. | |
| 8,794,510 B2* | 8/2014 | Buchmann ......... | G07D 11/0084 |
| | | | 235/379 |
| 9,123,192 B2 | 9/2015 | Buntscheck et al. | |
| 2005/0010525 A1 | 1/2005 | Ross et al. | |
| 2006/0163027 A1 | 7/2006 | Hobmeier et al. | |
| 2008/0126106 A1 | 5/2008 | He et al. | |
| 2010/0102234 A1 | 4/2010 | Hamasaki et al. | |
| 2010/0127070 A1* | 5/2010 | Sanders et al. ................ | 235/379 |
| 2010/0131407 A1* | 5/2010 | Folk et al. ....................... | 705/39 |
| 2012/0197433 A1 | 8/2012 | Buchmann et al. | |
| 2013/0046407 A1* | 2/2013 | Tomizawa et al. ........... | 700/215 |

FOREIGN PATENT DOCUMENTS

| | | |
|---|---|---|
| DE | 10 2009 034 065 A1 | 1/2011 |
| JP | 59-218584 A | 12/1984 |
| JP | 2002-203264 A | 7/2002 |
| JP | 2010-191881 A | 9/2010 |
| JP | 2012-27556 A | 2/2012 |
| WO | WO 2011/039833 A1 | 4/2011 |

OTHER PUBLICATIONS

Russian Office Action with English Translation (Application No. 2014137131) (11 pages—issued on Oct. 8, 2015).
Chinese Office Action with English Translation (Application No. 201380009092.3) (dated Jan. 5, 2016—35 pages).

* cited by examiner

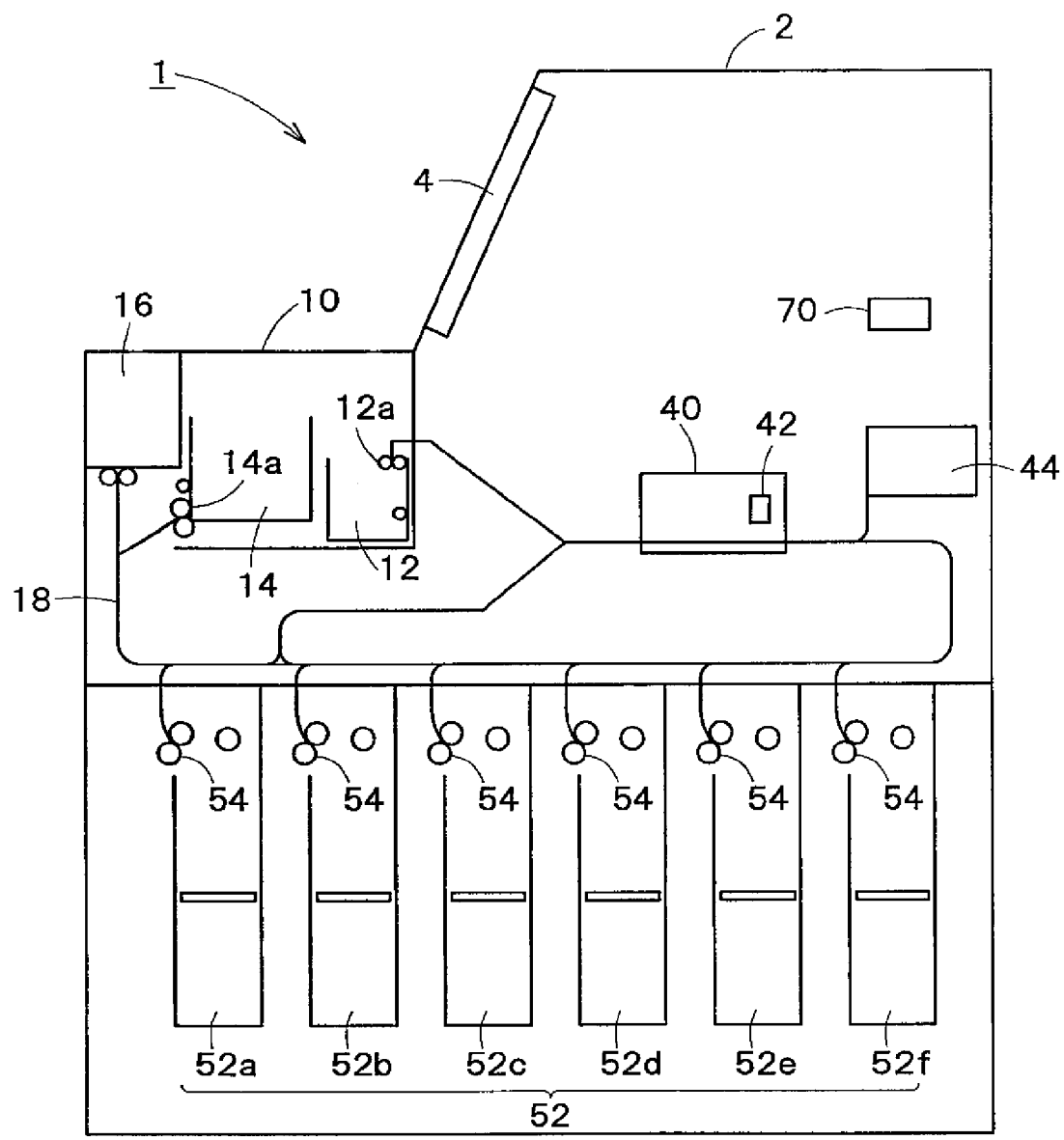
F I G. 1

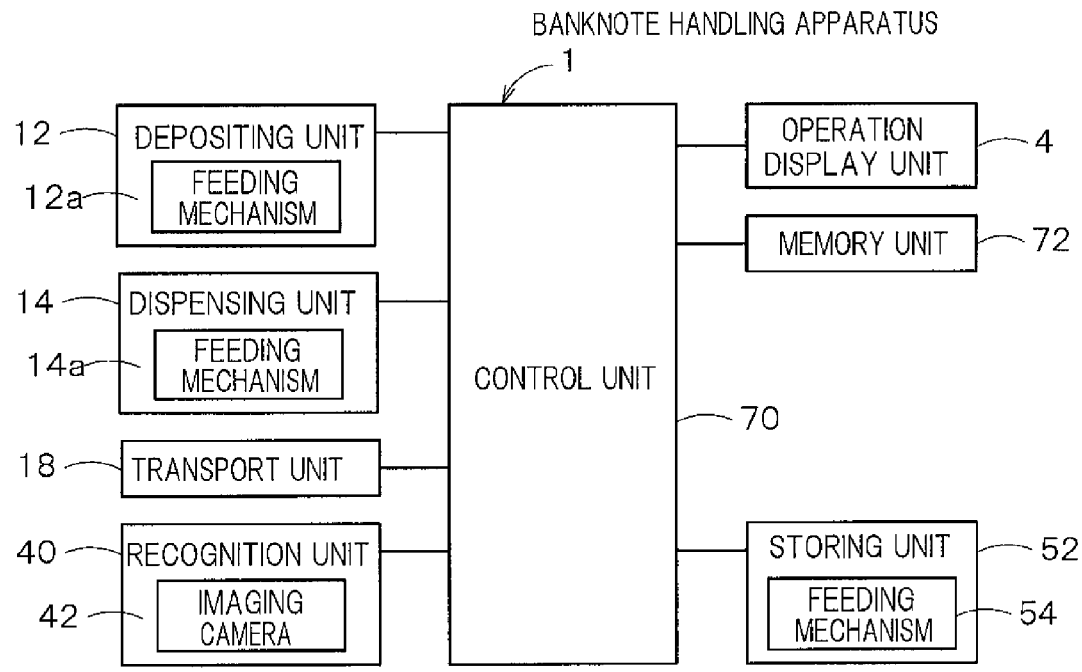
F I G. 2
| | SERIAL NUMBER | FIT NOTE | | UNFIT NOTE | DENOMINATION |
|---|---|---|---|---|---|
| | | ATM-Fit | Teller-Fit | | |
| STORING UNIT 52a | ○ | ○ | | | 100yuan |
| STORING UNIT 52b | ○ | | ○ | | 100yuan |
| STORING UNIT 52c | ○ | | ○ | | 50yuan |
| STORING UNIT 52d | × | | ○ | | 100yuan |
| STORING UNIT 52e | × | | ○ | | 50yuan |
| STORING UNIT 52f | ○/× | | | ○ | — |
F I G. 3

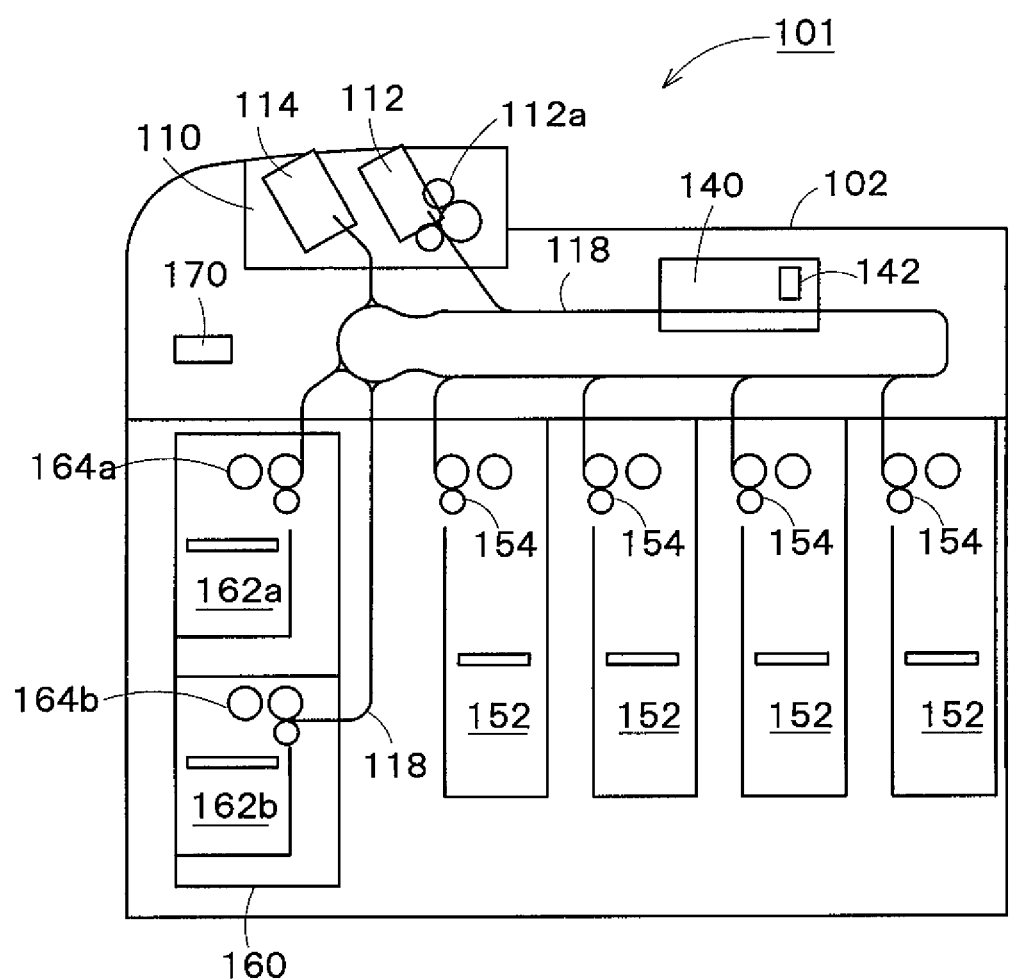
F I G. 4

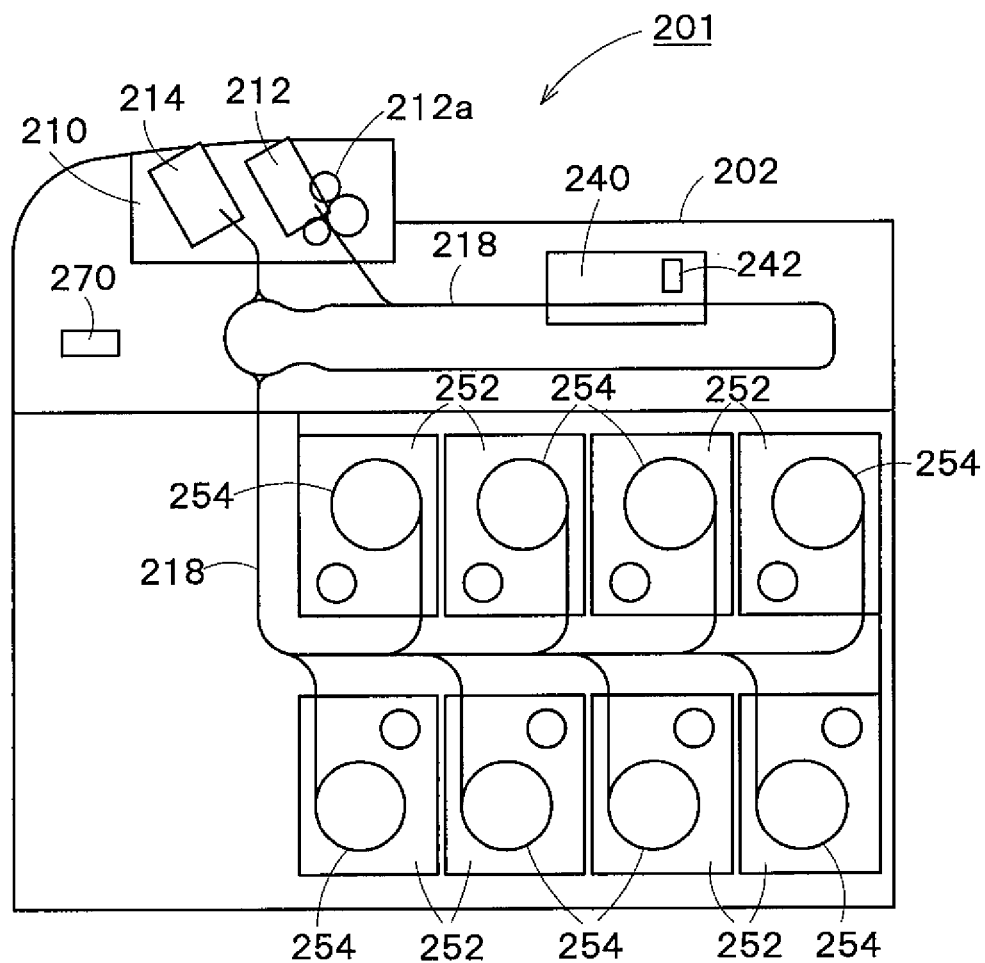
F I G. 5

BANKNOTE HANDLING APPARATUS AND BANKNOTE HANDLING METHOD

CROSS REFERENCE TO RELATED APPLICATIONS

This application is based upon and claims the benefit of priority from the prior Japanese Patent Application No. 2012-028620 filed on Feb. 13, 2012, the entire contents of which are incorporated herein by reference.

TECHNICAL FIELD

The present invention relates to a banknote handling apparatus configured to handle banknotes and a banknote handling method. In particular, the present invention relates to a banknote handling apparatus and a banknote handling method which are capable of directly using a banknote having been stored into a storing unit by a depositing process or the like, as a banknote to be loaded into an ATM or as a banknote to be dispensed to a customer in a bank counter, even when only an banknote whose serial number is managed is to be used as a banknote to be loaded into an ATM or as a banknote to be dispensed to a customer in a bank counter.

BACKGROUND ART

As a banknote handling apparatus for handling banknotes, various type ones have been conventionally known. For example, JP2002-203264A discloses a banknote depositing machine to be installed in a bank lobby and so on. In the banknote depositing machine disclosed in JP2002-203264A, when a plurality of banknotes of various denominations are deposited, banknotes having been put into a banknote inlet unit are fed, one by one, to a transport unit in a machine body, the banknotes are recognized by a recognition unit disposed at the transport unit, and, based on the recognition result, the banknotes are stored for each denomination into a plurality of storing units. In the banknote depositing machine disclosed in JP2002-203264A, a banknote having been recognized as a fit note by the recognition unit and a banknote having been recognized as an unfit note by the recognition unit are stored into the different storing units.

In a banknote handling apparatus configured to perform a banknote depositing and dispensing process, there is a case in which, after a banknote has been stored into a storing unit in a machine body by a depositing process, the banknote having been stored into the storing unit is used as a banknote to be loaded into an ATM or as a banknote to be dispensed to a customer in a bank counter. At this time, when only a banknote whose serial number, which is unique information for specifying an individual banknote, is to be used as a banknote to be loaded into an ATM or as a banknote to be dispensed to a customer in a bank counter, the conventional banknote handling apparatus has a problem in that it cannot directly use the banknote stored in the storing unit, as a banknote to be loaded into an ATM or as a banknote to be dispensed to a customer in a bank counter. This is because, in the conventional banknote handling apparatus, a banknote whose serial number has been read out by the recognition unit and a banknote whose serial number has not been recognized by the recognition unit are stored in a mixed state in the storing unit.

DISCLOSURE OF THE INVENTION

The present invention has been made in view of the above circumstances. The object of the present invention is to provide a banknote handling apparatus and a banknote handling method in which, even when only an banknote whose serial number is managed is to be used as a banknote to be loaded into an ATM or as a banknote to be dispensed to a customer in a bank counter, since a banknote whose serial number has been read out by a recognition unit and a banknote whose serial number has not been read out by the recognition unit are managed in a physically separated manner, a banknote having been stored into a storing unit by a depositing process or the like can be directly used as a banknote to be loaded into an ATM or as a banknote to be dispensed for a customer in a bank counter.

The preset invention is a banknote handling apparatus comprising:

a plurality of storing units configured to store a banknote;

a transport unit configured to transport the banknote having been put into a machine body to each of the storing units;

a recognition unit disposed at the transport unit and configured to read out a serial number of the banknote having been put into the machine body; and a control unit configured to control the transport unit such that the banknote whose serial number has been read out by the recognition unit and the banknote whose serial number has not been read out by the recognition unit are stored into different storing units.

According to such a banknote handling apparatus, the recognition unit is configured to read out a serial number of a banknote having been put into the machine body, while the control unit controls the transport unit such that a banknote whose serial number has been read out by the recognition unit and a banknote whose serial number has not been read out by the recognition unit are stored into the different storing units. Thus, even when only a banknote whose serial number is managed is used as a banknote to be loaded into an ATM or as a banknote to be dispensed to a customer in a bank counter, since a banknote whose serial number has been read out by the recognition unit and a banknote whose serial number has not been read out by the recognition unit are managed in a physically separated manner, a banknote having been stored into the storing unit by the depositing process or the like can be directly used as a banknote to be loaded into an ATM or as a banknote to be dispensed to a customer in a bank counter. Further, a banknote whose serial number has not been read out can be managed separately from a banknote whose serial number has been read out and a banknote whose serial number is not yet read out.

In the banknote handling apparatus of the present invention, the recognition unit may be configured to recognize a denomination of the banknote; and the control unit may control the transport unit such that the banknotes of different denominations having been recognized by the recognition unit are stored into the different storing units.

In the banknote handling apparatus of the present invention, the recognition unit may be configured to recognize the fitness of the banknote; and the control unit may control the transport unit such that the banknote having been recognized as a fit note by the recognition unit and the banknote having been recognized as an unfit note are stored into the different storing units.

The present invention is a banknote handling apparatus comprising:

a plurality of storing units configured to store a banknote;

a transport unit configured to transport the banknote having been put into a machine body to each of the storing units;

a recognition unit disposed at the transport unit and configured to read out a serial number of the banknote having been put into the machine body; and a control unit configured to control the transport unit; wherein:

the recognition unit is configured to recognize the fitness of the banknote; and when the banknote is recognized as a fit note by the recognition unit, the control unit controls the transport unit such that the banknote whose serial number has been read out by the recognition unit and the banknote whose serial number has not been read out by the recognition unit are stored into different storing units; and when the banknote is recognized as an unfit note by the recognition unit, the control unit controls the transport unit such that the banknote whose serial number has been read out by the recognition unit and the banknote whose serial number has not been read out by the recognition unit are stored into the same storing unit.

In the banknote handling apparatus of the present invention, when the fitness of the banknote is recognized, the recognition unit may determine the fitness of the banknote into three or more grades; and the control unit may control the transport unit such that the banknotes of different grades of the banknote fitness determination are stored into the different storing units.

In the banknote handling apparatus of the present invention, when the fitness of the banknote is recognized, the recognition unit may determine the fit note into two grades; and the control unit may control the transport unit such that the fit notes whose serial numbers have not been read out by the recognition unit are stored into the same storing unit, regardless of the grade of the determination for the fit note.

In the banknote handling apparatus of the present invention, the storing unit configured to store the banknote whose serial number has been read out by the recognition unit may be a cassette that is detachable from inside the machine body of the banknote handling apparatus.

The banknote handling apparatus of the present invention may further comprises:

an imaging unit configured to capture an image of a banknote whose serial number has not been read out by the recognition unit; and a memory unit configured to store an image data of the banknote having been captured by the imaging unit.

At this time, the image data of the banknote having been captured by the imaging unit may be stored in the memory unit in such a manner that the image data is associated with a transaction data.

The present invention is a banknote handling apparatus comprising:

a storing unit configured to store a banknote;

a transport unit configured to transport the banknote having been put into a machine body to the storing unit, or to return it outside of the machine body;

a recognition unit disposed at the transport unit and configured to read out a serial number of the banknote having been put into the machine body; and a control unit configured to control the transport unit such that the banknote whose serial number has been read out by the recognition unit is stored into the storing unit, and that the banknote whose serial number has not been read out by the recognition unit is returned outside of the machine body.

According to such a banknote handling apparatus, the recognition unit is configured to read out a serial number of a banknote having been put into the machine body, while the control unit controls the transport unit such that a banknote whose serial number has been read out by the recognition unit is stored into the storing unit, and that a banknote whose serial number has not been read out by the recognition unit is returned outside of the machine body. Thus, even when only a banknote whose serial number is managed is used as a banknote to be loaded into an ATM or as a banknote to be dispensed to a customer in a bank counter, since a banknote whose serial number has been read out by the recognition unit and a banknote whose serial number has not been read out by the recognition unit are managed in a physically separated manner, a banknote having been stored into the storing unit by the depositing process or the like can be directly used as a banknote to be loaded into an ATM or as a banknote to be dispensed to a customer in a bank counter.

In such a banknote handling apparatus, the recognition unit may be configured to recognize a denomination of the banknote.

In addition, the recognition unit may be configured to recognize the fitness of the banknote.

In this case, when the fitness of the banknote is recognized, the recognition unit may determine the fitness of the banknote into three or more grades.

In addition, the storing unit configured to store a banknote whose serial number has been read out by the recognition unit nay be a cassette that is detachable from inside the machine body of the banknote handling apparatus.

The present invention is a banknote handling apparatus comprising:

a plurality of storing units configured to store a banknote;

a transport unit configured to transport the banknote having been put into a machine body to each of the storing units;

a recognition unit disposed at the transport unit and configured to read out a serial number of the banknote having been put into the machine body; and a control unit configured to selectively perform any one of two operation modes including a first operation mode wherein the control unit controls the transport unit such that the banknote whose serial number has been read out by the recognition unit and the banknote whose serial number has not been read out by the recognition unit are stored into different storing units, and a second operation mode wherein the control unit controls the transport unit such that the banknote whose serial number has been read out by the recognition unit and the banknote whose serial number has not been read out by the recognition unit are stored into the same storing unit.

According to such a banknote handling apparatus, even when only a banknote whose serial number is managed is used as a banknote to be loaded into an ATM or as a banknote to be dispensed to a customer in a bank counter, since the control unit is caused to perform the first operation mode, a banknote whose serial number has been read out by the recognition unit and a banknote whose serial number has not been read out by the recognition unit are managed in a physically separated manner, a banknote having been stored into the storing unit by the depositing process or the like can be directly used as a banknote to be loaded into an ATM or as a banknote to be dispensed to a customer in a bank counter.

The preset invention is a banknote handling apparatus comprising:

a storing unit configured to store a banknote;

a transport unit configured to transport the banknote having been put into a machine body to the storing unit, or to return it outside of the machine body;

a recognition unit disposed at the transport unit and configured to read out a serial number of the banknote having been put into the machine body; and a control unit configured to selectively perform any one of two operation modes including a third operation mode wherein the control unit controls the transport unit such that the banknote whose serial number has been read out by the recognition unit is stored into the storing unit, and that the banknote whose serial number has not been read out by the recognition unit is returned outside of the machine body, and a fourth operation mode wherein the banknote whose serial number has been read out by the recognition unit and the banknote whose serial number has not been read out by the recognition unit are stored into the storing unit.

According to such a banknote handling apparatus, even when only a banknote whose serial number is managed is used as a banknote to be loaded into an ATM or as a banknote to be dispensed to a customer in a bank counter, since the control unit is caused to perform the third operation mode, a banknote whose serial number has been read out by the recognition unit and a banknote whose serial number has not been read out by the recognition unit are managed in a physically separated manner, a banknote having been stored into the storing unit by the depositing process or the like can be directly used as a banknote to be loaded into an ATM or as a banknote to be dispensed to a customer in a bank counter.

The present invention is a banknote handling method to be performed in a banknote handling apparatus, comprising:

reading out a serial number of a banknote having been put into a machine body of the banknote handling apparatus by a recognition unit; and storing the banknote whose serial number has been read out by the recognition unit and the banknote whose serial number has not been read out by the recognition unit into different storing units.

According to such a banknote handling method, a banknote whose serial number has been read out by the recognition unit and a banknote whose serial number has not been read out by the recognition unit are stored into the different storing units. Thus, even when only a banknote whose serial number is managed is used as a banknote to be loaded into an ATM or as a banknote to be dispensed to a customer in a bank counter, since a banknote whose serial number has been read out by the recognition unit and a banknote whose serial number has not been read out by the recognition unit are managed in a physically separated manner, a banknote having been stored into the storing unit by the depositing process or the like can be directly used as a banknote to be loaded into an ATM or as a banknote to be dispensed to a customer in a bank counter.

The present invention is a banknote handling method to be performed in a banknote handling apparatus, comprising:

reading out a serial number of a banknote having been put into a machine body of the banknote handling apparatus by a recognition unit; and storing the banknote whose serial number has been read out by the recognition unit into a storing unit, and returning the banknote whose serial number has not been read out by the recognition unit outside of the machine body.

According to such a banknote handling method, a banknote whose serial number has been read out by the recognition unit is stored into the storing unit, and a banknote whose serial number has not been read out by the recognition unit is returned outside of the machine body. Thus, even when only a banknote whose serial number is managed is used as a banknote to be loaded into an ATM or as a banknote to be dispensed to a customer in a bank counter, since a banknote whose serial number has been read out by the recognition unit and a banknote whose serial number has not been read out by the recognition unit are managed in a physically separated manner, a banknote having been stored into the storing unit by the depositing process or the like can be directly used as a banknote to be loaded into an ATM or as a banknote to be dispensed to a customer in a bank counter.

According to the banknote handling apparatus and the banknote handling method of the present invention, even when only a banknote whose serial number is managed is used as a banknote to be loaded into an ATM or as a banknote to be dispensed to a customer in a bank counter, a banknote having been stored into the storing unit by the depositing process or the like can be directly used as a banknote to be loaded into an ATM or as a banknote to be dispensed to a customer in a bank counter.

BRIEF DESCRIPTION OF THE DRAWINGS

FIG. 1 is a structural view showing an inside structure of a banknote handling apparatus according to one embodiment of the present invention.

FIG. 2 is a functional block view of the banknote handling apparatus shown in FIG. 1.

FIG. 3 is a table for explaining how to select one storing unit among six storing units into which a banknote having been recognized by a recognition unit is stored, when a depositing process or the like is performed in the banknote handling apparatus shown in FIG. 1.

FIG. 4 is a structural view showing an inside structure of the banknote handling apparatus according to another configuration of the present invention.

FIG. 5 is a structural view showing an inside structure of the banknote handling apparatus according to yet another configuration of the present invention.

MODE FOR CARRYING OUT THE INVENTION

One embodiment of the present invention will be explained with reference to the drawings. FIGS. 1 to 3 are views showing a banknote handling apparatus in this embodiment. In more detail, FIG. 1 is a structural view showing an inside structure of the banknote handling apparatus in this embodiment. FIG. 2 is a functional block view of the banknote handling apparatus shown in FIG. 1. FIG. 3 is a table for explaining how to select one storing unit among six storing units into which a banknote having been recognized by a recognition unit is stored, when a depositing process or the like is performed in the banknote handling apparatus shown in FIG. 1.

A schematic structure of the banknote handling apparatus in this embodiment is explained with reference to FIG. 1. As shown in FIG. 1, the banknote handling apparatus 1 in this embodiment includes a depositing and dispensing unit 10 having a depositing unit 12 and a dispensing unit 14, and a deposited-money reject unit 16. The depositing unit 12 is configured to feed one by one the banknote(s) having been put into the depositing unit 12 to an inside of a machine body (housing) 2, by a feeding mechanism 12a. A transport unit 18 is disposed inside the machine body 2 of the banknote handling apparatus 1, so that the banknotes, which have been fed one by one to the inside of the machine body 2 by the feeding mechanism 12a, are transported one by one, by the transport unit 18. In addition, the transport unit 18 is connected to the dispensing unit 14 and the deposited-money reject unit 16, so that the banknotes are sent one by one from the transport unit 18 to the dispensing unit 14 and the deposited-money reject unit 16. In addition, the dispensing unit 14 is provided with a feeding mechanism 14a, so that the banknote having been sent from the transport unit 18 to the dispensing unit 14 can be returned to the transport unit 18 by the feeding mechanism 14a.

A recognition unit 40 is disposed at the transport unit 18, so that the banknote transported by the transport unit 18 is recognized by the recognition unit 40 as to its denomination, authenticity, fitness and so on. In addition, the recognition unit 40 is provided with an imaging unit configured to capture an image of the banknote so as to obtain an image data of the banknote. Based on the image data of the banknote captured by the imaging unit, the recognition unit 40 is configured to read out a serial number of the banknote. A serial number of the banknote is unique information for specifying an individual banknote. The banknotes respectively have different serial numbers composed of, e.g., ten digits. The imaging unit may also use an image sensor used for recognizing a denomination of the banknote and/or fitness of the banknote. Alternatively, an imaging camera 42 may be installed separately from the image sensor.

In addition, as shown in FIG. 1, a collecting unit 44 is connected to the transport unit 18. In a dispensing process, when the banknote was sent to the dispensing unit 14 but the banknote was not taken out from the dispensing unit 14 after a predetermined time has passed, the banknote is returned to the transport unit 18 by the feeding mechanism 14a disposed on the dispensing unit 14, and the banknote returned to the transport unit 18 is sent to the collecting unit 44. The collecting unit 44 is detachable from inside the machine body 2. Thus, by detaching the collecting unit 44 out of the machine body 2, an operator can collect the banknote(s) in the collecting unit 44. In this manner, the banknote left in the dispensing unit 14 can be collected.

In addition, the banknote handling apparatus 1 in this embodiment has, inside the machine body 2, a plurality of (specifically six) storing units 52 which are configured to store the banknotes in a stacked state. These storing units 52 are indicated by reference numbers 52a, 52b, 52c, 52d, 52e and 52f in this order from the left side in FIG. 1. Each of the storing units 52 is connected to the transport unit 18, so that the banknotes are sent from the transport unit 18 to the respective storing units 52 so as to be stored therein in a stacked state. Each storing unit 52 is provided with a feeding mechanism 54, so that the banknote(s) stored in each storing unit 52 can be fed out, one by one, to the transport unit 18 by the feeding mechanism 54. In the banknote handling apparatus 1 in this embodiment, each storing unit 52 is formed of a cassette that is detachable from inside the machine body 2 by an operator. Thus, by detaching each storing unit 52 from the machine body 2, an operator can collect the banknote(s) stored in the storing unit 52.

In addition, a control unit 70 is disposed inside the machine body 2 of the banknote handling apparatus 1 in this embodiment. The respective constituent elements of the banknote handling apparatus 1 are controlled by the control unit 70. A structure of the control unit 70 will be described in more detail later.

In addition, an operation display unit 4 formed of, e.g., a touch panel is provided on the machine body 2. Contents of the banknote process by the banknote handling apparatus 1, specifically, an amount of the banknotes for each denomination which are stored in the respective storing units 52, the number thereof and/or a total amount of the stored banknotes and so on are displayed on the operation display unit 4. In addition, an operator can transmit various commands to the control unit 7 through the operation display unit 4.

FIG. 2 is a functional block view of the banknote handling apparatus shown in FIG. 1. As shown in FIG. 2, connected to the control unit 70 are the depositing unit 12, the dispensing unit 14, the transport unit 18, the recognition unit 40, the storing unit 52, the operation display unit 4 and so on. The control unit 70 is configured to transmit command signals respectively to the depositing unit 12, the dispensing unit 14, the transport unit 18, the recognition unit 40, the storing unit 52, the operation display unit 4 and so on, so as to control these constituent elements. In addition, recognition information of the banknote having been recognized by the recognition unit 40 is transmitted to the control unit 70. At this time, the recognition unit 40 includes, e.g., a line sensor configured to read out the banknote being transported. The image data of the banknote having been captured by the line sensor are also transmitted to the control unit 70. In addition, a command having been inputted by an operator through the operation display unit 4 is transmitted to the control unit 70.

In addition, as shown in FIG. 2, a memory unit 72 is provided at the control unit 70. The memory unit 72 is configured to store various set information of the banknote handling apparatus 1, contents of the banknote process by the banknote handling apparatus 1 and so on. To be specific, the memory unit 72 is configured to store, for example, an amount of the banknotes for each denomination which are stored in the respective storing units 52, the number thereof and/or a total amount of the stored the banknotes and so on. In addition, the memory unit 72 is configured to store the image data of the banknote having been captured by the imaging unit of the recognition unit 40. At this time, the image data of the banknote having been captured by the imaging unit are stored in the memory unit 72 such that the image data of the banknote is associated with a transaction data of the banknote handling apparatus 1.

Next, a depositing process to be performed in the banknote handling apparatus 1 shown in FIG. 1 and so on is explained below. When the depositing process is performed in the banknote handling apparatus 1, an operator firstly puts the banknote(s) into the depositing unit 12 of the depositing and dispensing unit 10. Then, the operator inputs a command for starting the depositing process to the control unit 70 through the operation display unit 4. Thus, the banknotes are fed one by one to the inside of the machine body 2 by the feeding mechanism 12a disposed on the depositing unit 12, and the banknotes are sent to the transport unit 18. The banknotes are sent to the recognition unit 40 by the transport unit 18, and the denomination, an authenticity, the fitness and so on of each banknote are recognized by the recognition unit 40. At this time, the image of the banknote is captured by the imaging unit disposed in the recognition unit 40 so as so as to obtain the image data of the banknote. Based on the image data of the banknote captured by the imaging unit, the recognition unit 40 reads out a serial number of the banknote.

When the banknote having been recognized by the recognition unit 40 is a normal banknote, the banknote is sent to the respective storing units 52 by the transport unit 18 so as to be stored into one of the storing units 52. How to select one storing unit among the six storing units 52 into which the banknote is stored will be explained later. On the other hand, when the banknote having been recognized by the recognition unit 40 is not a normal banknote, such as a counterfeit banknote or an abnormal transport banknote, the banknote is sent as a reject banknote to the deposited-money reject unit 16 by the transport unit 18 so as to be stored into the deposited-money reject unit 16. The reject banknote having been stored into the deposited-money reject unit 16 is taken out from the deposited-money reject unit 16 by the operator, after the depositing process has been performed.

Next, a dispensing process to be performed in the banknote handling apparatus 1 shown in FIG. 1 and so on is explained below. When the dispensing process is performed in the banknote handling apparatus 1, an operator inputs a command for starting the dispensing process to the control unit 70 through the operation display unit 4. At this time, the operator inputs the number of the banknotes to be dispensed for each denomination, a total amount thereof and so on. After the command for starting the dispensing process has been inputted to the control unit 70, the banknote is fed out from each storing unit 52 by the feeding mechanism 54 to the transport unit 18. Then, the banknote is sent to the recognition unit 40 by the transport unit 18, and the denomination, the authenticity, the fitness and so on of the banknote are recognized by the recognition unit 40.

When the banknote having been recognized by the recognition unit 40 is a normal banknote, the banknote is sent to the dispensing unit 14 by the transport unit 18 so as to be stored into the dispensing unit 14. In this manner, the operator can take out the banknote stored in the dispensing unit 14, as the banknote to be dispensed, from the dispensing unit 14. On the other hand, when the banknote having been recognized by the recognition unit 40 is not a normal banknote, such as an abnormal transport banknote, the banknote is sent as a reject banknote to the collecting unit 44 by the transport unit 18 so as to be stored into the collecting unit 44. The reject banknote having been stored into the collecting unit 44 is collected, together with the whole collecting unit 44, from the machine body 2 by the operator, after the dispensing process has been performed.

Next, a money change process to be performed in the banknote handling apparatus 1 shown in FIG. 1 and so on is explained below. In the money change process to be performed in the banknote handling machine 1, when the banknote is put into the depositing unit 12 of the depositing and dispensing unit 10, the banknote is fed to the inside of the machine body 2 by the feeding mechanism 14a, and the banknote is recognized by the recognition unit 40. Thereafter, when the recognized banknote is a normal banknote, the banknote is sent to one of the storing units 52. Meanwhile, when the recognized banknote is not a normal banknote, the banknote is sent as a reject banknote to the deposited-money reject unit 16. After that, a plurality of the banknotes, which are the same in total amount as an amount of the banknote having been stored into the one storing unit 52 but are different therefrom in denomination, are fed out from the respective storing units 52 to the transport unit 18 by the feeding mechanism 54. The banknotes are recognized by the recognition unit 40, and then the banknotes are sent to the dispensing unit 14 so as to be stored into the dispensing unit 14. In this manner, an operator can take out the banknotes stored in the dispensing unit 14, as changed banknotes, from the dispensing unit 14.

In the banknote handling apparatus in this embodiment, when the depositing process and the money change process are performed, the control unit 70 controls the transport unit 18 such that the banknote whose serial number has been read out by the recognition unit 40 and the banknote whose serial number has not been read out by the recognition unit 40 are stored into different storing units 52. Note that a condition where "the banknote whose serial number has been read out by the recognition unit 40" is not limited to a case where all the digits in the serial number of the banknote are correctly read out by the recognition unit 40. The condition includes a case where a serial number of the banknote is read out in such a manner that at least the banknote can be specified, e.g., a case where eight or more digits among ten digits in the serial number are read out.

In addition, the control unit 70 controls the transport unit 18 such that the banknotes having been recognized by the recognition unit 40 are stored into the different storing units 52 depending on their denominations. In addition, the control unit 70 controls the transport unit 18 such that the banknote having been recognized as a fit note by the recognition unit 40 and the banknote having been recognized as an unfit note by the recognition unit 40 are stored into the different storing units 52. The unfit note includes a torn banknote that is restored by a tape, for example. How to select one storing unit among the six storing units 52 into which the banknote having been recognized by the recognition unit 40 is stored is explained below with reference to FIG. 3. In FIG. 3, there is explained a case in which the banknotes to be stored into the respective storing units 52 are the banknotes of Chinese yuan. However, the banknotes to be stored into the respective storing units 52 are not limited to the banknotes of Chinese yuan, and the banknotes of Japanese yen, US dollar, euro and so on may be stored into the respective storing units 52.

As shown in FIG. 3, in the banknote handling apparatus 1 in this embodiment, while the depositing process or the money change process is being performed, when the fitness of the banknote is recognized by the recognition unit 40, the determination of the fit notes is performed into two grades. To be more specific, there are two grades for the determination of the fit note: one is an ATM-Fit note which is close to a new banknote so that it can be loaded into an ATM (Automated-Teller Machine) and can be dispensed from the ATM; and the other is a Teller-Fit note which is more stained as compared with an ATM-Fit note so that it cannot be loaded into an ATM but can be dispensed to a customer in a bank counter or the like. Namely, the recognition unit 40 is configured to recognize the fitness of the banknote as three grades, i.e., an ATM-Fit note, a Teller-Fit note, and an Unfit note. In FIG. 3, the banknote having been recognized as an ATM-Fit note by the recognition unit 40 is stored into the storing unit (storing unit 52a) having a mark "○" in the ATM-Fit column. The banknote having been recognized as a Teller-Fit note by the recognition unit 40 is stored into one the storing units (storing units 52b, 52c, 52d and 52e) having the mark "○" in the Teller-Fit column. The banknote having been recognized as the unfit note by the recognition unit 40 is stored into the storing unit (storing unit 52f) having the mark "○" in the Unfit note column.

As shown in FIG. 3, in the banknote handling apparatus 1 in this embodiment, when the depositing process or the money change process is performed, the banknote whose serial number has been read out by the recognition unit 40 is stored into one of the storing units 52a, 52b and 52c. Meanwhile, the banknote whose serial number has not been read out by the recognition unit 40 is stored into the storing unit 52*d* or 52*e*. As described above, the unfit note is stored into the storing unit 52*f*. Thus, the banknote whose serial number has been read out by the recognition unit 40 and the banknote whose serial number has not been read out by the recognition unit 40 are stored into the storing unit 52*f* in a mixed state. Among the storing units 52*a*, 52*b* and 52*c* into which the banknote whose serial number has been read out by the recognition unit 40 is stored, the banknote having been recognized as an ATM-Fit note by the reaction unit 40 is stored into the storing unit 52*a*, and the banknote having been recognized as a Teller-Fit note by the recognition unit 40 is stored into the storing unit 52*b* or 52*c*, as described above. In addition, the banknotes are stored into the storing units 52*b* and 52*c* depending on their denominations. To be more specific, the banknote of 100 yuan is stored into the storing unit 52*b*, while the banknote of 50 yuan is stored into the storing unit 52*c*. Note that the banknote of 100 yuan is stored also into the storing unit 52*a*.

On the other hand, as described above, the banknote whose serial number has not been recognized by the recognition unit 40 is stored into the storing unit 52*d* or 52*e*. Specifically, the banknotes are stored into the storing units 52*d* and 52*e* depending on their denominations. To be more specific, the banknote of 100 yuan is stored into the storing unit 52*d*, while the banknote of 50 yuan is stored into the storing unit 52*e*. In addition, the unfit note is stored into the storing unit 52*f*. Specifically, the unfit notes are stored into the storing unit 52*f* in a denomination mixed state.

As to the banknote having been stored into the storing unit 52*a*, the banknote in the storing unit 52*a* can be directly loaded into an ATM, after an operator has taken out the whole storing unit 52*a* outside of the machine body 2. On the other hand, as to the banknotes having been stored into the storing units 52*b*, 52*c*, 52*d* and 52*e*, the banknotes in the storing units 52*b*, 52*c*, 52*d* and 52*e* cannot be directly loaded into an ATM, but the banknotes can be dispensed to a customer in the banknote counter or the like, after an operator has taken out the whole storing units 52*b*, 52*c*, 52*d* and 52*e* outside of the machine body 2. In addition, since the banknote having been stored into the storing unit 52*f* is the unfit note, the banknote cannot be dispensed to a customer. The banknote is returned to a central bank or the like.

As described above, according to the banknote handling apparatus 1 in this embodiment, the recognition unit 40 is configured to read out a serial number of the banknote having been put into the machine body 2, while the control unit 70 controls the transport unit 18 such that the banknote whose serial number has been read out by the recognition unit 40 and the banknote whose serial number has not been read out by the recognition unit 40 are stored into the different storing units 52. Thus, even when only the banknote whose serial number is managed is used as the banknote to be loaded into an ATM or as the banknote to be dispensed to a customer in a bank counter, since the banknote whose serial number has been read out by the recognition unit 40 and the banknote whose serial number has not been read out by the recognition unit 40 are managed in a physically separated manner, the banknote having been stored into the storing unit 52 by a depositing process and so on can be directly used as the banknote to be loaded into an ATM or as the banknote to be dispensed to a customer in a bank counter.

In addition, in the banknote handling apparatus 1 in this embodiment, the recognition unit 40 is configured to recognize the denomination of the banknote, while the control unit 70 controls the transport unit 18 such that the banknotes having been recognized by the recognition unit 40 are stored into the different storing units 52 depending on their denominations. In addition, the recognition unit 40 is configured to recognize the fitness of the banknote, while the control unit 70 controls the transport unit 18 such that the banknote having been recognized as the fit note by the recognition unit 40 and the banknote having been recognized as the unfit note by the recognition unit 40 are stored into the different storing units 52.

In the banknote handling apparatus 1 shown in FIG. 1, the control unit 70 controls the transport unit 18 such that, when the banknote is recognized as the fit note by the recognition unit 40, the banknote whose serial number has been read out by the recognition unit 40 and the banknote whose serial number has not been read out by the recognition unit 40 are stored into the different storing units 52 (see storing units 52*b*, 52*c*, 52*d* and 52*e* in FIG. 3), and that, when the banknote is recognized as the unfit note by the recognition unit 40, the banknote whose serial number has been read out by the recognition unit 40 and the banknote whose serial number has not been read out by the recognition unit 40 are stored into the same storing unit (storing unit 52*f* in FIG. 3).

In addition, in the banknote handling apparatus 1 in this embodiment, when the fitness of the banknote is recognized, the recognition unit 40 determines the fitness of the banknote into three grades (ATM-Fit note, Teller-Fit note, Unfit note). In more detail, when the fitness of the banknote is recognized, the recognition unit 40 determines the fit note into two grades (ATM-Fit note, Teller-Fit note). The control unit 70 controls the transport unit 18 such that the banknotes of different grades of the banknote fitness determination are stored into the different storing units 52. As a modification example, when the fitness of the banknote is recognized, the recognition unit 40 may determine the fitness of the banknote into two grades: one is the fit note and the other is the unfit note. Alternatively, as another modification example, the recognition unit may 40 may determine the fitness of the banknote into four or more grades. In addition, as yet another modification example, the control unit 70 may control the transport unit 18 such that the fit notes whose serial numbers have not been read out by the recognition unit 40 are stored into the same storing unit, regardless of the grade of the determination for the fit note.

In addition, in the banknote handling apparatus 1 in this embodiment, the storing unit 52, which is configured to store the banknote whose serial number has been read out by the recognition unit 40, is formed of a cassette that is detachable by an operator from inside the machine body 2 of the banknote handling apparatus 1.

In addition, in the banknote handling apparatus 1 in this embodiment, the image data of the banknote whose serial number has not been read out by the recognition unit 40 is captured by the imaging unit, and the image data of the banknote is stored in the memory unit 72. At this time, the image data of the banknote having been captured by the imaging unit are stored in the memory unit 72 such that the image data of the banknote is associated with the transaction data of the banknote in the banknote handling apparatus 1. Thus, an operator can trace (follow) the banknote whose serial number has not been read out by the recognition unit 40. When a process speed of the control unit 70 and/or a storage capacity of the memory unit 72 are/is allowed, the image data of the banknote whose serial number has been read out may be captured, and the image data of the banknote may be stored in the memory unit 72 and/or associated with the transaction data.

The banknote handling apparatus 1 in this embodiment is not limited to the above one, but can be variously modified.

For example, when the depositing process is performed, the control unit 70 is not configured to control the transport unit 18 such that the banknote whose serial number has been read out by the recognition unit 40 and the banknote whose serial number has not been read out by the recognition unit 40 are stored into the different storing units 52. Instead, the control unit 70 may be configured to control the transport unit 18 such that the banknote whose serial number has been read out by the recognition unit 40 is stored into one of the storing units 52, and that the banknote whose serial number has not been recognized by the recognition unit 40 is returned outside of the machine body 2. More specifically, when the depositing process is performed, the control unit 70 controls the transport unit 18 such that the banknote whose serial number has not been read out by the recognition unit 40 is sent to the deposited-money reject unit 16. Then, an operator can take out the banknote having been sent to the deposited-money reject unit 16, from the deposited-money reject unit 16. According to the banknote handling apparatus 1 in such a modification example, even when only the banknote whose serial number is managed is used as the banknote to be loaded into an ATM or as the banknote to be dispensed to a customer in a bank counter, since the banknote whose serial number has been read out by the recognition unit 40 and the banknote whose serial number has not been read out by the recognition unit 40 are managed in a physically separated manner, the banknote having been stored into the storing unit 52 by the depositing process or the like can be directly used as the banknote to be loaded into an ATM or as the banknote to be dispensed to a customer in a bank counter.

In addition, in the banknote handling apparatus 1 in such a modification example, the recognition unit 40 may be configured to recognized the denomination of the banknote, while the control unit 70 may be configured to control the transport unit 18 such that the banknotes are stored into the different storing units 52 depending on denominations of the banknotes having been recognized by the recognition unit 40. In addition, the recognition unit 40 may be configured to recognize the fitness of the banknote, while the control unit 70 may be configured to control the transport unit 18 such that the banknote having been recognized as the fit note by the recognition unit 40 and the banknote having been recognized as the unfit note are stored into the different storing units 52.

In addition, in the banknote handling apparatus 1 in the aforementioned modification example, when the fitness of the banknote is recognized, the recognition unit 40 may determine the fitness of the banknote into three or more grades (e.g., ATM-Fit note, Teller-Fit note, Unfit note and so on). The control unit 70 may be configured to control the transport unit 18 such that the banknotes of different grades of the banknote fitness determination are stored into the different storing units 52.

In addition, in the banknote handling apparatus 1 in the aforementioned modification example, the storing unit 52, which is configured to store the banknote whose serial number has been read out by the recognition unit 40, may be formed of a cassette that is detachable by an operator from inside the machine body 2 of the banknote handling apparatus 1.

In addition, as the banknote handling apparatus 1 in still another modification example, the following embodiment can be employed. Namely, in the banknote handling apparatus 1 in still another modification example, the control unit 70 is configured to selectively perform any one of two operation modes, i.e., a first operation mode in which the control unit 70 controls the transport unit 18 such that the banknote whose serial number has been read out by the recognition unit 40 and the banknote whose serial number has to been read out by the recognition unit 40 are stored into the different storing units 52, and a second operation mode in which the control unit 70 controls the transport unit 18 such that the banknote whose serial number has been read out by the recognition unit 40 and the banknote whose serial number has not been recognized by the recognition unit 40 are stored into the same storing unit 52. Switching of the operation between the first operation mode and the second operation mode in the control unit 70 is performed by an operator who gives a command for performing the first or second operation mode to the control unit 70 through the operation display unit 4. According to such the banknote handling apparatus 1, when only the banknote whose serial number is managed is used as the banknote to be loaded into an ATM or as the banknote to be dispensed to a customer in a bank counter, an operator gives a command for performing the first operation mode, whereby the banknote whose serial number has been read out by the recognition unit 40 and the banknote whose serial number has not been read out by the recognition unit 40 can be managed in a physically separated manner. Thus, the banknote having been stored into the storing unit 52 by the depositing process or the like can be directly used as the banknote to be loaded into an ATM or as the banknote to be dispensed to a customer in a bank counter.

In addition, as the banknote handling apparatus 1 in yet another modification example, the following embodiment can be employed. Namely, in the banknote handling apparatus 1 in yet another modification example, the control unit 70 may be configured to selectively perform one of two operation modes, i.e., a third operation modes in which the control unit 70 controls the transport unit 18 such that the banknote whose serial number has been read out by the recognition unit 40 is stored into one of the storing units 52, and that the banknote whose serial number has not been read out by the recognition unit 40 is returned to the outside of the machine body 2, and a fourth operation mode in which the control unit 70 controls the transport unit 18 such that the banknote whose serial number has been read out by the recognition unit 40 and the banknote whose serial number has not been read out by the recognition unit 450 are stored into the storing unit 52. Switching of the operation between the third operation mode and the fourth operation mode in the control unit 70 is performed by an operator whose gives a command for performing the third or fourth operation mode to control unit 70 through the operation display unit 4. According to such the banknote handling apparatus 1, when only the banknote whose serial number is managed is used as the banknote to be loaded into an ATM or as the banknote to be dispensed to a customer in a bank counter, an operator gives a command for performing the third operation mode, whereby the banknote whose serial number has been read out by the recognition unit 40 and the banknote whose serial number has not been read out by the recognition unit 40 can be managed in a physically separated manner. Thus, the banknote having been stored into the storing unit 52 by the depositing process or the like can be directly used as the banknote to be loaded into an ATM or as the banknote to be dispensed to a customer in a bank counter.

Other than the banknote handling apparatus according to the present invention having the structure shown in FIG. 1, apparatuses having structures shown in FIGS. 4 and 5 can be employed. The banknote handling apparatus 101 shown in FIG. 4 includes a depositing and dispensing unit 110 having a depositing unit 112 and a dispensing unit 114. The depositing unit 112 is configured to feed one by one the banknote(s) having been put into the depositing unit 112, to an inside of a machine body (housing) 102. A transport unit 118 is disposed inside the machine body 102, so that the banknotes having been fed one by one to the inside of the machine body 102 are transported one by one, by the transport unit 118. In addition, the transport unit 118 is connected to the dispensing unit 114, so that the banknotes are sent one by one from the transport unit 118 to the dispensing unit 114.

A recognition unit 140 is provided at the transport unit 118, so that the banknote transported by the transport unit 118 is recognized by the recognition unit 140 as to its denomination, authenticity, fitness and so on. In addition, the recognition unit 140 is provided with an imaging unit configured to capture the image of the banknote so as to obtain the image data of the banknote. Based on the image data of the banknote captured by the imaging unit, the recognition unit 140 is configured to read out a serial number of the banknote. The imaging unit may also use the image sensor used for recognizing the denomination of the banknote and/or the fitness of the banknote of the banknote. Alternatively, an imaging camera 142 may be installed separately from the image sensor.

In addition, as shown in FIG. 4, the banknote handling apparatus 101 has, inside the machine body 102, a plurality of (specifically four) storing units 152 which are configured to store the banknotes in a stacked state. Each of the storing units 152 is connected to the transport unit 118, so that the banknotes are sent to the respective storing units 152 so as to be stored therein in a stacked state. Each storing unit 152 is provided with a feeding mechanism 154, so that the banknote(s) stored in each storing unit 152 can be fed out one by one to the transport unit 118 by the feeding mechanism 154. In the banknote handling apparatus 101 in this embodiment, each storing unit 152 is formed of a cassette that is detachable by an operator from inside the machine body 102. Thus, by detaching each storing unit 152 from the machine body 102, an operator can collect the banknote(s) stored in the storing unit 152.

In addition, the banknote handling apparatus 101 shown in FIG. 4 is provided with a storage unit 160. The storage unit 160 is divided into two storing units for storing the banknote, i.e., an upper storing unit and a lower storing unit. To be more specific, the storage unit 160 has an upper storing unit 162a and a lower storing unit 162 that are configured to store the banknotes in a stacked state, and feeding mechanisms 164a and 164b configured to feed one by one the banknotes stored in the respective storing units 162a and 162b to the transport unit 118. In the banknote handling apparatus 101 in this embodiment, the storage unit 160 is formed of a cassette that is detachable by an operator from inside the machine body 102. Thus, by detaching the storing unit 160 from the machine body 102, an operator can collect the banknote(s) stored in the storage unit 160.

In addition, as shown in FIG. 4, a control unit 170 is disposed inside the machine body 102 of the banknote handling apparatus 101. The respective constituent elements of the banknote handling apparatus 101 are controlled by the control unit 170.

More specifically, the control unit 170 controls the transport unit 118 such that the banknote whose serial number has been read out by the recognition unit 140 and the banknote whose serial number has not been read out by the recognition unit 140 are stored into the different storing units 152, 162a and 162b. Thus, even when only the banknote whose serial number is mange is used as the banknote to be loaded into an ATM or as the banknote to be dispensed to a customer in a bank counter, since the banknote whose serial number has been read out by the recognition unit 140 and the banknote whose serial number has not been read out by the recognition unit 140 are managed in a physically separated manner, the banknote having been stored into one the storing units 152, 162a and 162b by the depositing process or the like can be directly used as the banknote to be loaded into an ATM or as the banknote to be dispensed to a customer in a bank counter.

As a modification example of the banknote handling apparatus 101 shown in FIG. 4, the control unit 170 may be configured to control the transport unit 118 such that the banknote whose serial number has been read out by the recognition unit 140 is stored into one the storing units 152, 162a and 162b, and that the banknote whose serial number has not been recognized by the recognition unit 140 is returned outside of the machine body 102. More specifically, when the depositing process or the like is performed, the control unit 170 controls the transport unit 118 such that the banknote whose serial number has not been recognized by the recognition unit 140 is sent to the dispensing unit 114. Thus, an operator can take out the banknote having been stored into the dispensing unit 114, from the dispensing unit 114. Also in this case, since the banknote whose serial number has been read out by the recognition unit 140 and the banknote whose serial number has not been read out by the recognition unit 140 are managed in a physically separated manner, the banknote having been stored into one of the storing units 152, 162a and 162b by the depositing process or the like can be directly used as the banknote to be loaded into an ATM or as the banknote to be dispensed to a customer in a bank counter.

The banknote handling apparatus 201 shown in FIG. 5 includes a depositing and dispensing unit 210 having a depositing unit 212 and a dispensing unit 214. The depositing unit 212 is configured to feed one by one the banknote(s) having been put into the depositing unit 212 to an inside of a machine body (housing) 202. A transport unit 218 is disposed inside the machine body 202, so that the banknotes having been fed one by one to the inside of the machine body 202 are transported one by one, by the transport unit 218. In addition, the transport unit 218 is connected to the dispensing unit 214, so that the banknotes are sent one by one from the transport unit 218 to the dispensing unit 214.

A recognition unit 240 is provided at the transport unit 218, so that the banknote transported by the transport unit 218 is recognized by the recognition unit 240 as to its denomination, authenticity, fitness and so on. In addition, the recognition unit 240 is provided with an imaging unit configured to capture the image of the banknote so as to obtain the image data of the banknote. Based on the image data of the banknote captured by the imaging unit, the recognition unit 240 is configured to read out a serial number of the banknote. The imaging unit may also use the image sensor used for recognizing the denomination of the banknote and/or the fitness of the banknote of the banknote. Alternatively, an imaging camera 242 may be installed separately from the image sensor.

In addition, as shown in FIG. 5, the banknote handling apparatus 201 has, inside the machine body 102, a plurality of (specifically eight) storing units 252 which are configured to store the banknote(s). Each storing unit 252 is of a tape-reeling type. To be more specific, each storing unit 252 has a drum 254 that is rotatable in forward and rearward directions. A pair of tapes is reeled up by the drum 254. The banknotes having been sent from the transport unit 218 to each storing unit 252 are sequentially reeled up one by one by the drum 254 so as to be stored in the storing unit 252, while the banknotes are sandwiched between the pair of tapes. When the drum 254 is rotated in the rearward direction, the reeled-up banknotes are fed out one by one to be sent to the transport unit 218. In the banknote handling apparatus 201 in this embodiment, each storing unit 252 is formed of a cassette that is detachable by an operator from inside the machine body 202. Thus, by detaching each storing unit 252 from the machine body 202, an operator can collect the banknote(s) stored in the storing unit 252.

In addition, as shown in FIG. 5, a control unit 270 is disposed inside the machine body 202 of the banknote handling apparatus 201. The respective constituent elements of the banknote handling apparatus 201 are controlled by the control unit 270.

More specifically, the control unit 270 controls the transport unit 218 such that the banknote whose serial number has been read out by the recognition unit 240 and the banknote whose serial number has not been read out by the recognition unit 240 are stored into the different storing units 252. Thus, even when only the banknote whose serial number is managed is used as the banknote to be loaded into an ATM or as the banknote to be dispensed to a customer in a bank counter, since the banknote whose serial number has been read out by the recognition unit 240 and the banknote whose serial number has not been read out by the recognition unit 240 are managed in a physically separated manner, the banknote having been stored into one of the storing units 252 by the depositing process or the like can be directly used as the banknote to be loaded into an ATM or as the banknote to be dispensed to a customer in a bank counter.

As a modification example of the banknote handling apparatus 201 shown in FIG. 5, the control unit 270 may be configured to control the transport unit 218 such that the banknote whose serial number has been read out by the recognition unit 240 is stored into one of the storing units 252, and that the banknote whose serial number has not been recognized by the recognition unit 240 is returned outside of the machine body 202. More specifically, when the depositing process or the like is performed, the control unit 270 controls the transport unit 218 such that the banknote whose serial number has not been recognized by the recognition unit 240 is sent to the dispensing unit 214. Thus, an operator can take out the banknote having been stored into the dispensing unit 214, from the dispensing unit 214. Also in this case, since the banknote whose serial number has been read out by the recognition unit 240 and the banknote whose serial number has not been read out by the recognition unit 240 are managed in a physically separated manner, the banknote having been stored into the storing units 252 by the depositing process or the like can be directly used as the banknote to be loaded into an ATM or as the banknote to be dispensed to a customer in a bank counter 1 Banknote handling apparatus
18 Transport unit
40 Recognition unit
42 Imaging camera
52 Storing unit
70 Control unit
72 Memory unit
101 Banknote handling apparatus
118 Transport unit
140 Recognition unit
142 Imaging camera
152 Storing unit
162a, 162b Storing unit
170 Control unit
201 Banknote handling apparatus
218 Transport unit
240 Recognition unit
242 Imaging camera
252 Storing unit
270 Control unit

The invention claimed is:

1. A banknote handling apparatus comprising:
a plurality of storing units configured to store a banknote;
a transport unit configured to transport the banknote having been put into a machine body to each of the storing units;
a recognition unit disposed at the transport unit and configured to read out a serial number of the banknote having been put into the machine body and a fitness of the same banknote; and
a control unit configured to control the transport unit such that, when the banknote is recognized as a fit note by the recognition unit, the banknote whose serial number has been read out by the recognition unit and the banknote whose serial number has not been read out by the recognition unit are stored into different storing units.

2. The banknote handling apparatus according to claim 1, wherein:
the recognition unit is configured to recognize a denomination of the banknote; and
the control unit controls the transport unit such that the banknotes of different denominations having been recognized by the recognition unit are stored into the different storing units.

3. The banknote handling apparatus according to claim 1, wherein:
the control unit controls the transport unit such that the banknote having been recognized as a fit note by the recognition unit and the banknote having been recognized as an unfit note are stored into the different storing units.

4. The banknote handling apparatus according to claim 1, when the banknote is recognized as an unfit note by the recognition unit, the control unit controls the transport unit such that the banknote whose serial number has been read out by the recognition unit and the banknote whose serial number has not been read out by the recognition unit are stored into the same storing unit.

5. The banknote handling apparatus according to claim 1, wherein:
when the fitness of the banknote is recognized, the recognition unit determines the fitness of the banknote into three or more grades; and
the control unit controls the transport unit such that the banknotes of different grades of the banknote fitness determination are stored into the different storing units.

6. The banknote handling apparatus according to claim 1, wherein
when the fitness of the banknote is recognized, the recognition unit determines the fit note into two grades; and
the control unit controls the transport unit such that the fit notes whose serial numbers have not been read out by the recognition unit are stored into the same storing unit, regardless of the grade of the determination for the fit note.

7. The banknote handling apparatus according to claim 1, wherein
the storing unit configured to store the banknote whose serial number has been read out by the recognition unit is a cassette that is detachable from inside the machine body of the banknote handling apparatus.

8. The banknote handling apparatus according claim 1, further comprising:
an imaging unit configured to capture an image of a banknote whose serial number has not been read out by the recognition unit; and
a memory unit configured to store an image data of the banknote having been captured by the imaging unit.

9. The banknote handling apparatus according to claim 8, wherein
the image data of the banknote having been captured by the imaging unit is stored in the memory unit in such a manner that the image data is associated with a transaction data.

10. A banknote handling method to be performed in a banknote handling apparatus, comprising:
reading out a serial number of a banknote having been put into a machine body of the banknote handling apparatus and a fitness of the same banknote by a recognition unit; and
storing the banknote whose serial number has been read out by the recognition unit and the banknote whose serial number has not been read out by the recognition unit into different storing units, when the banknote is recognized as a fit note by the recognition unit.

* * * * *